(12) United States Patent
Zhang et al.

(10) Patent No.: US 9,678,703 B2
(45) Date of Patent: Jun. 13, 2017

(54) INFORMATION PROCESSING METHOD AND ELECTRONIC DEVICE THEREOF

(71) Applicants: Beijing Lenovo Software Ltd., Beijing (CN); Lenovo (Beijing) Limited, Beijing (CN)

(72) Inventors: Weiwei Zhang, Beijing (CN); Jie Xia, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 23 days.

(21) Appl. No.: 14/465,215

(22) Filed: Aug. 21, 2014

(65) Prior Publication Data

US 2015/0160910 A1 Jun. 11, 2015

(30) Foreign Application Priority Data

Dec. 11, 2013 (CN) .......................... 2013 1 0676782

(51) Int. Cl.
| | |
|---|---|
| *G06F 3/14* | (2006.01) |
| *G06F 1/00* | (2006.01) |
| *H04N 9/31* | (2006.01) |
| *G09G 3/00* | (2006.01) |
| *G03B 21/14* | (2006.01) |

(52) U.S. Cl.
CPC .............. *G06F 3/1431* (2013.01); *G06F 1/00* (2013.01); *G06F 3/1423* (2013.01); *H04N 9/31* (2013.01); *H04N 9/3173* (2013.01); *G03B 21/145* (2013.01); *G09G 3/002* (2013.01)

(58) Field of Classification Search
CPC ........ G06F 3/1431; G06F 3/041–3/047; G06F 2203/04101–2203/04113; G06F 1/1639; G06F 1/1647–1/165
USPC ......... 345/173–178; 178/18.01–18.09, 18.11
See application file for complete search history.

(56) References Cited

U.S. PATENT DOCUMENTS

| | | | |
|---|---|---|---|
| 8,351,983 B2* | 1/2013 | Kim ..................... | H04N 9/3173 345/1.1 |
| 8,760,414 B2* | 6/2014 | Kim ..................... | G06F 1/1624 345/1.1 |
| 2008/0018591 A1* | 1/2008 | Pittel ..................... | G06F 1/1616 345/156 |
| 2010/0099458 A1* | 4/2010 | Shin ..................... | H04M 1/0241 455/556.1 |
| 2010/0177047 A1* | 7/2010 | Brenneman ........... | G06F 1/1616 345/173 |

* cited by examiner

*Primary Examiner* — Stephen Sherman
(74) *Attorney, Agent, or Firm* — Schwegman Lundberg & Woessner, P.A.

(57) ABSTRACT

An information processing method and apparatus are provided in which a first switching operation instructs an electronic device to switch from a first mode to a second mode while the electronic device is in the first mode, in response to the first switching operation controlling the electronic device to switch from the first mode to the second mode, wherein a display unit set in a face of the electronic device acts as an auxiliary input unit and a projection unit, for projecting content, is set as an output unit while the electronic device is in the first mode; and wherein the display unit acts as an output unit and the projection unit is set as an auxiliary input unit while the electronic device is in the second mode.

12 Claims, 6 Drawing Sheets

INFORMATION PROCESSING METHOD AND ELECTRONIC DEVICE THEREOF

CROSS-REFERENCE TO RELATED APPLICATION(S)

This application claims priority to the Chinese Application No. 201310676782.6, filed on Dec. 11, 2013, which is incorporated herein by reference in its entirety.

TECHNICAL FIELD

The present application relates to the field of electronic technology, and in particular, to an information processing method and an electronic device thereof.

BACKGROUND

With the continuous development of the science, people have enjoyed the conveniences brought by the development of the science through types of electronic devices. Nowadays people may enjoy a comfortable life afforded by the development of the science and technique by the aid of various types of electronic devices.

However, with respect to the device such as the mobile phone, the tablet computer or even the notebook computer, its display interface relies on its own LCD (Liquid Crystal Display), and thus the size of the display interface is limited by the size of the mobile phone, the tablet computer or the notebook computer itself, which can be inconvenient for the operation of the user. Furthermore, when it is desired to share the viewing of the content on the electronic device with others, the others may surround the display of the electronic device to view the content, which brings more inconveniences.

Commonly in an electronic device, a projection unit has an display area and the display unit of the electronic device is the operation area for controlling the projected content. When the electronic device changes its posture or projection mode, the functions of the projection unit and the display unit on the electronic device remain unchanged, which results in inconvenient usage and poor experience for the user. As an example, when a mobile telephone capable of projection is standing on a table, a picture is projected on the table and the projection interface is located in front of the screen of the mobile phone. At this time, the user may desire to control the play of the displayed content on the display screen of the mobile telephone by a posture operation on the projection interface. Therefore, there is a technical problem that the display attributes of the projection unit and the display unit on the electronic device remain unchanged even if the electronic device changes its posture or projection mode.

SUMMARY

According to embodiments of the present application, an information processing method and an electronic device thereof are provided to switch the display attributes of the projection unit and the display unit on the electronic device when the electronic device changes its posture so that projection mode can be achieved.

An embodiment of the application provides an information processing method comprising: obtaining a first switching operation instructing an electronic device to switch from a first mode to a second mode in the case that the electronic device is in the first mode; responding to the first switching operation; and controlling the electronic device to switch from the first mode to the second mode; wherein a display unit set in a face of the electronic device acts as an auxiliary input unit and a projection unit, for projecting content, is set as an output unit in the case that the electronic device is in the first mode; and wherein the display unit acts as an output unit and the projection unit is set as an auxiliary input unit in the case that the electronic device is in the second mode.

Optionally, the electronic device further comprises a first input unit and a second input unit. The method further comprises: enabling the first input unit so as to implement the auxiliary input function by the first input unit in the case that the electronic device is in the first mode; and enabling the second input unit so as to implement an input control function on the first display interface by the second input unit in the case that the electronic device is in the second mode.

Optionally, in the case that the electronic device switches from the first mode to the second mode, the method further comprises: adjusting the display direction of the auxiliary input unit to be consistent with the display direction of the output unit.

Optionally, in the case that the electronic device switches from the first mode to the second mode, the method further comprises: exchanging the projected content of the projection unit and displayed content of the display unit.

Optionally, in the case that the electronic device is in the second mode, the method further comprises: obtaining a second switching operation instructing the electronic device to switch from the second mode to the first mode; responding to the second switching operation; and controlling the electronic device to switch from the second mode to the first mode.

Optionally, obtaining the first switching operation comprises: obtaining the first switching operation in the case that an angle between the display unit and a horizontal plane is adjusted to fall into a first predetermined range; and obtaining the second switching operation comprises: obtaining the second switching operation in the case that the angle between the display unit and the horizontal plane is adjusted to fall into a second predetermined range.

Optionally, obtaining the first switching operation comprises: obtaining the first switching operation in the case that a connection mechanism, rotatablely connecting a first body of the electronic device and a second body of the electronic device, is rotated so that the first display interface is located at a second side corresponding to the display unit; and obtaining the second switching operation comprises: obtaining the second switching operation in the case that the connection mechanism is rotated so that the first display interface is located at a first side corresponding to the display unit.

An embodiment of the application provides an electronic device comprises: a body; a display unit set on a first face of the body, the display unit having a first edge and a second edge opposite to the first edge, wherein the second edge is parallel to the first edge; a projection unit set inside the body and which projects the content to be projected onto a first display interface, the first display interface being projected at a first side corresponding to the first edge of the display unit, the display unit being capable of displaying a second display interface, a predetermined angle being formed between the first display interface and the second display interface; and a processing unit which: obtains a first switching operation instructing the electronic device to switch from a first mode to a second mode in the case that the electronic device is in the first mode; responds to the first switching operation; controls the electronic device to switch from the first mode to the second mode; wherein the display unit acts as an auxiliary input unit and the projection unit is set as an output unit in the case that the electronic device is in the first mode; and wherein the display unit acts as an output unit and the projection unit is set as an auxiliary input unit in the case that the electronic device is in the second mode.

Optionally, the electronic device further comprises: a first input unit, which is enabled in the case that the electronic device is in the first mode so as to implement the auxiliary input function by the first input unit; and a second input unit, which is enabled in the case that the electronic device is in the second mode so as to implement an input control function on the first display interface by the second input unit.

Optionally, in the case that the electronic device switches from the first mode to the second mode, the processing unit further: adjusts the display direction of the auxiliary input unit to be consistent with the display direction of the output unit.

Optionally, in the case that the electronic device switches from the first mode to the second mode, the processing unit further exchanges the projected content of the projection unit and the displayed content of the display unit.

Optionally, in the case that the electronic device is in the second mode, the processing unit further: obtains a second switching operation instructing the electronic device to switch from the second mode to the first mode; responds to the second switching operation; and controls the electronic device to switch from the second mode to the first mode.

Optionally, the processing unit further: obtains the first switching operation in the case that the angle between the display unit and the horizontal plane is adjusted to fall into a first predetermined range; and obtains the second switching operation in the case that the angle between the display unit and the horizontal plane is adjusted to fall into a second predetermined range.

Optionally, the body comprises: a first body; a second body; and a rotational connection structure for rotatablely connecting the first body and the second body, wherein the display unit is set on a first face of the first body, and the projection unit is set inside the first body.

Optionally, the processing unit further: obtains the first switching operation in the case that the connection mechanism is rotated so that the first display interface is located at a second side corresponding to the second edge of the display unit; and obtains the second switching operation in the case that the connection mechanism is rotated so that the first display interface is located at a first side corresponding to the first edge of the display unit.

DETAILED DESCRIPTION

Figure 1:
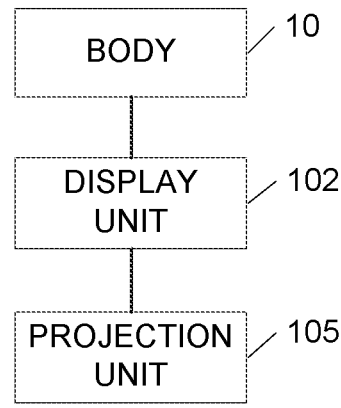
FIG. 1 is a functional block diagram of an electronic device according to an embodiment of the present application.

The information processing method and an electronic device thereof provided by the embodiments of the application eliminate the technical problem where the display attributes of the projection unit and the display unit on the electronic device remain unchanged even if the electronic device changes its posture or projection mode, and achieve the technical effect of switching the display attributes of the projection unit and the display unit on the electronic device when the electronic device changes its posture or projection mode.

The one or more technical solutions provided according to the embodiments of the present application have at least the following technical effects.

The projection unit acts as an output unit and the display unit acts as an auxiliary input unit when the electronic device is in the first mode, and the display unit is switched to act as an output unit and the projection unit is set as an auxiliary input unit when the electronic device switches from the first mode to the second mode, which eliminates the technical problem where the display attributes of the projection unit and the display unit on the electronic device remain unchanged even if the electronic device changes its posture or projection mode, and achieves the technical effect of switching the display attributes of the projection unit and the display unit on the electronic device when the electronic device changes its posture or projection mode.

An embodiment of the application provides an information processing method which is applied to an electronic device comprising a body, a display unit and a projection unit, the display unit being set in a face of the body, the display unit having a first edge and a second edge opposite to the first edge wherein the second edge is parallel to the first edge, the projection unit being set inside the body and configured to project the content to be projected onto a projection area, a first display interface corresponding to the content to be projected being formed when a first bearing plane is present in the projection area, the first display interface being located at a first side corresponding to the first edge of the display unit, the display unit being capable of displaying a second display interface, a predetermined angle being formed between the first display interface and the second display interface, the method comprising: obtaining a first switching operation instructing the electronic device to switch from a first mode to a second mode when the electronic device is in the first mode; responding to the first switching operation; and controlling the electronic device to switch from the first mode to the second mode; wherein the display unit acts as an auxiliary input unit and the projection unit is set as an output unit in the case that the electronic device is in the first mode; and wherein the display unit acts as an output unit and the projection unit is set as an auxiliary input unit in the case that the electronic device is in the second mode. Therefore, according to the method of this embodiment, the projection unit acts as an output unit and the display unit acts as an auxiliary input unit in the case that the electronic device is in the first mode, and the display unit is switched to act as an output unit and the projection unit is set as an auxiliary input unit in the case that the electronic device switches from the first mode to the second mode, which eliminates the issue where the display attributes of the projection unit and the display unit on the electronic device remain unchanged even if the electronic device changes its posture or projection mode, and achieves the technical effect of switching the display attributes of the projection unit and the display unit on the electronic device when the electronic device changes its posture or projection mode.

For better understanding the above technical solution, the main implementation principle, the detailed implementation and the benefit effects to be achieved as illustrated by the embodiments of the application will be set forth in detail, in connection with the accompanying figures.

An embodiment of the present application provides an information processing method applied in an electronic device which may be a notebook computer, a tablet computer, a mobile telephone, etc.

First referring to FIG. 1 which is a functional block diagram of an electronic device according to an embodiment of the present application, the electronic device includes a body 10, a display unit 102 and a projection unit 105.

Figure 2A:
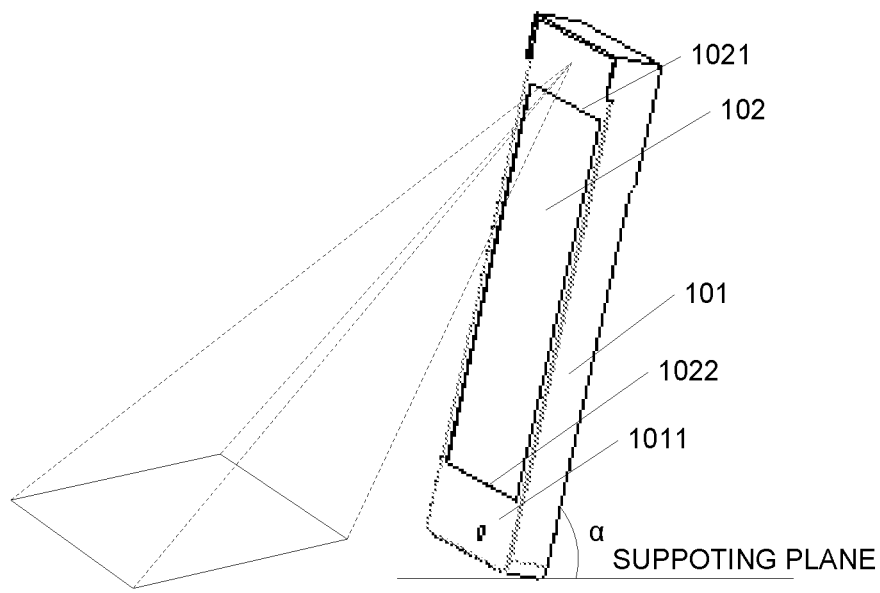
FIGS. 2a-2b are illustrative structure diagrams of an electronic device according to an embodiment of the present application.

Then referring to FIG. 2 which is an illustrative structure diagram of the electronic device according to this embodiment, the display unit 102 is set on a face 1011 of the body 10 and has a first edge 1021 and a second edge 1022 opposite to the first edge 1021, wherein the second edge 1022 is parallel to the first edge 1021. The projection unit 105 is set inside the body 10 and configured to project the content to be projected through a projection area. A first display interface corresponding to the content to be projected is formed when a first bearing plane is present in the projection area. The first display interface is located at a first side corresponding to the first edge 1021 of the display unit 102. The display unit 102 is capable of displaying a second display interface. A predetermined angle is formed between the first display interface and the second display interface. As shown in FIG. 2a, the angle between the first display interface and the second display interface is approximately 90°.

First of all, the electronic device of the embodiment has two projection modes and the display interface, in which the content to be projected is projected, is located at different sides of the display unit when the electronic device is in different projection modes.

In FIG. 2a, when the electronic device is performing projection, the bearing plane of the projected content is located at the second side corresponding to the second edge 1022 of the display unit 102. At this time, the projection mode of the electronic device is referred to as a second projection mode in the embodiment. For example, when the electronic device is standing on a table, the bearing plane of the projected content is located on the table where the user can view the content projected by the electronic device.

Figure 2B:
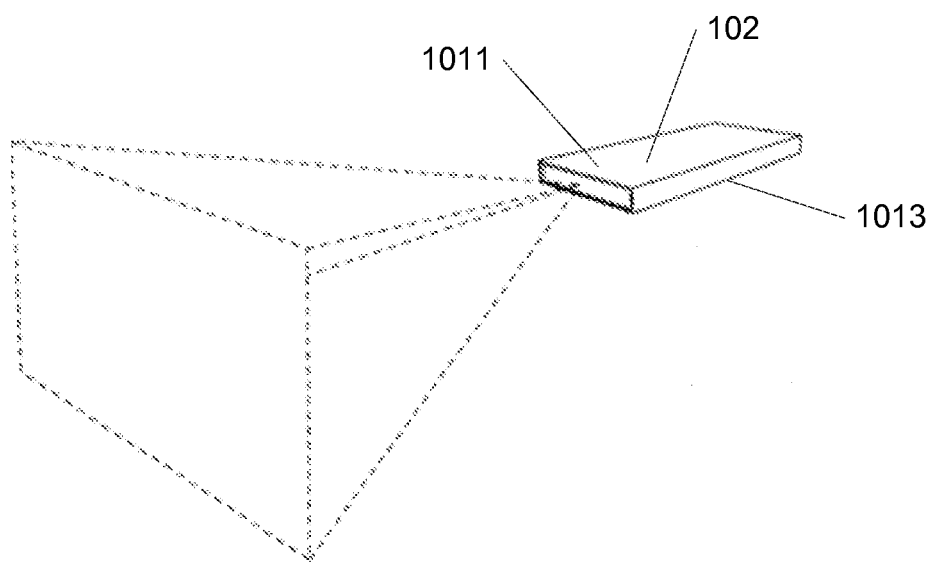

There is also another projection mode as shown in FIG. 2b, in which the bearing plane of the projected content is located at the first side corresponding to the first edge 1021 of the display unit 102. At this time, the projection mode of the electronic device is referred to as a first projection mode in the embodiment. For example, when the electronic device is lying down, the bearing plane of the projected content may be located on a wall where the user can view the content projected by the electronic device.

Figure 3:
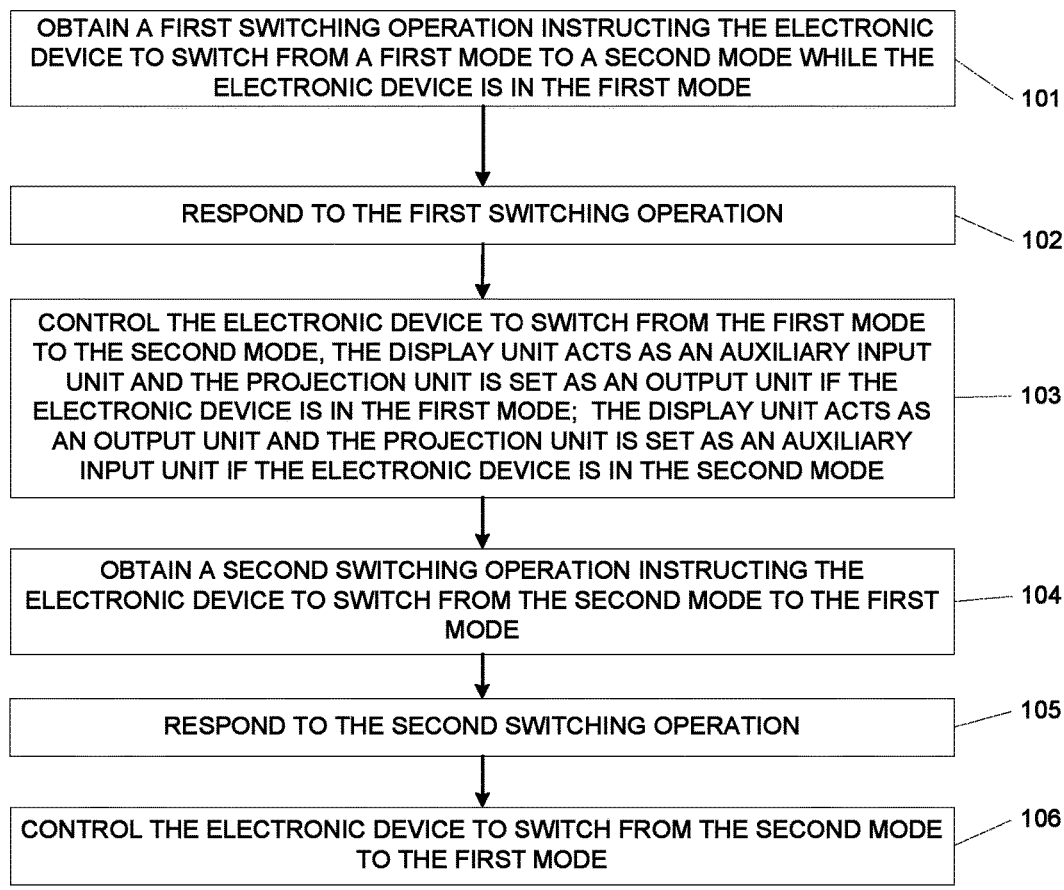
FIG. 3 is a flowchart of an information processing method according to an embodiment of the present application.

In the case that the electronic device is in a first mode, as shown in FIG. 2b, the display unit acts as an auxiliary input unit and the projection unit is set as the output unit. At this time, a user may control the output content, which is output by the projection unit, by operations on the display unit. FIG. 3 which is a flowchart of an information processing method according to the embodiment will be referred to below. The method comprises:

Step 101: obtaining a first switching operation instructing the electronic device to switch from a first mode to a second mode in the case that the electronic device is in the first mode;

Step 102, responding to the first switching operation;

Step 103, controlling the electronic device to switch from the first mode to the second mode.

In the case that the electronic device has switched to the second mode, as shown in FIG. 2a, the display unit acts as the output unit and the projection unit is set as an auxiliary input unit. At this time, the user may control the played content, which is output by the display unit, by operations on projection interface, i.e. the first display interface.

The electronic device may also switch from the second mode to the first mode. Also referring to FIG. 3, in the case that the electronic device is in the second mode, the method further comprises:

Step 104: obtaining a second switching operation instructing the electronic device to switch from the second mode to the first mode;

Step 105, responding to the second switching operation;

Step 106, controlling the electronic device to switch from the second mode to the first mode.

Furthermore, in the case that the electronic device is in the first mode, as shown in FIG. 2b, the electronic device further comprises a first input unit, and the method further comprises: enabling the first input unit so as to implement the auxiliary input function by the first input unit. The first input unit may be a touch unit or a hardware switch. By enabling the touch unit or the hardware switch, the user may implement the input function on the display unit though the operation of the touch unit or the hardware switch. The input function may be a control for the played content of the projection unit, such as forwarding or pausing the played video.

In the case that the electronic device is in the second mode, as shown in FIG. 2a, the electronic device further comprises a second input unit, and the method further comprises: enabling the second input unit so as to implement an input control function on the first display interface by the second input unit. The second input unit may be a gesture detection device for detecting whether there is a gesture input or not. If there is a gesture input, operations corresponding to the gesture input are executed in response to the gesture input. The gesture detection device, for example, comprises a transmitter and a receiver. The transmission path of the transmitter and the reception path of the receiver are the same as the projection path, and then the gesture detection device may detect the gesture input of the user conveniently irrespectively of the projection mode. Optionally, the transmitter and the receiver are located at the left side and the right side of the projection unit respectively. The transmitter and the receiver may operate according to the principle of the infrared in practice. In other embodiments, of course, the gesture detection unit may also be another detection unit, such as a camera. By enabling the gesture detection device, the user may implement the input function on the projection interface (i.e. the first display interface) though the operation of the gesture detection device. The input function may be a control for the played content of the projection unit. For example, when browsing pictures on the display unit, the picture will be switched automatically to another one when a gesture of a finger of the user sliding to the left on the first display interface is detected.

Preferably, in order to save power, the first input unit is enabled and the second input unit is disabled in the case that the electronic device is in the first mode, while the second input unit is enabled and the first input unit is disabled in the case that the electronic device is in the second mode.

Optionally, in the case that the electronic device switches from the first mode to the second mode, step 103 further comprises: adjusting the display direction of the auxiliary input unit to be consistent with the display direction of the output unit. That is, in the case that the electronic device is in the second mode, after the adjustment of the display direction of the auxiliary input unit, the direction of the first display interface viewed by the user and the direction of the pictures or letters on the display unit are the same, i.e. the positive direction, which prevents the pictures or letters displayed on the first display interface and viewed by the user from being upside-down in the case that the electronic device switches from the first mode to the second mode.

Optionally, in the case that the electronic device switches from the first mode to the second mode, step 103 further comprises: exchanging the projected content of the projection unit and the displayed content of the display unit. In the first mode, the display unit acts as an auxiliary input unit and the projection unit is set as the output unit, and the display interface of the display unit displays an operation interface for controlling the played content of the projection unit, for example, a virtual keyboard, such as pause, forward, stop, etc.; while the display interface of the projection unit displays the played contents, such as pictures, movies, music, etc. In the case that the electronic device switches to the second mode, in order to achieve a better user experience and a better control, the projected content of the projection unit and the displayed content of the display unit are exchanged so that the display interface of the projection unit displays an operation interface for controlling the played content of the display unit and the display interface of the display unit displays the played contents.

How the electronic device obtains a first switching operation and a second switching operation according to the present application will be introduced by two ways as below.

The first one is to detect the angel between the display unit and the horizontal plane.

In a detailed implementation, obtaining the first switching operation comprises: in the case that the angle between the display unit and the horizontal plane is adjusted to fall into a first predetermined range, the first switching operation is obtained. As shown in FIG. 2*a*, the horizontal plane may be the supporting plane for supporting the electronic device, and the predetermined range can be 70°-90°. Or putting differently, when the electronic device is in the second mode, the angle α between the display unit and the supporting plane is within the range of 70°-90°. Other ranges, of course, can be set and are not limited in the present application. When the electronic device detects that the angle α between the display unit and the horizontal plane is within the range of 70°-90° by a sensor such as a gradienter or a gyroscope, it obtains a switching instruction for switching to the second mode.

When the electronic device obtains the second switching operation, the second switching operation is used to instruct the electronic device to switch from the second mode to a first mode. In a detailed implementation, obtaining the second switching operation comprises: in the case that the angle between the display unit and the horizontal plane is adjusted to fall into a second predetermined range, the second switching operation is obtained. As shown in FIG. 2*b*, the predetermined range can be 0°-30°. Or putting differently, in the case that the electronic device is in the first mode, the angle α between the display unit and the supporting plane is within the range of 0°-30°. Other ranges, of course, can be set and are not limited in the present application. When the electronic device detects that the angle α between the display unit and the horizontal plane is within the range of 0°-30° by a sensor such as a gradienter or a gyroscope, it obtains a switching instruction for switching to the first mode.

Figure 4:
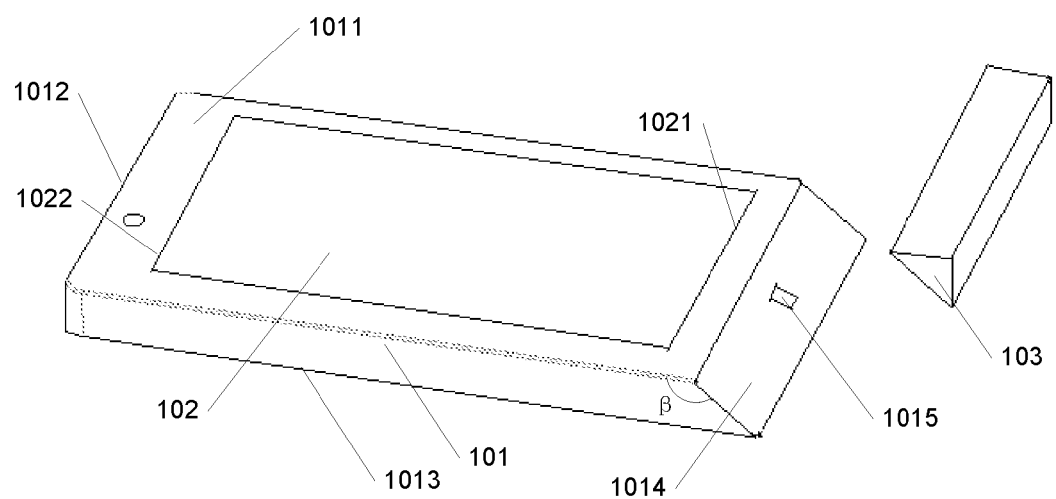
FIG. 4 is a structure diagrams of an electronic device according to an embodiment of the present application.

The second one is to switch the mode of the electronic device by a rotational connection mechanism in the case that the electronic device has a gesture as shown in FIG. 4 which is an exemplary structure diagrams of an electronic device according to an embodiment is switched.

In this embodiment, the structure of the electronic device will be introduced at first. Referring to FIG. 4 again, a body 10 comprises: a first body 101; a second body 103; and a rotational connection mechanism 104 for rotatablely connecting the first body 101 and the second body 103. A display unit 102 is set on a first face 1011 of the first body 101. A projection unit 105 is set inside the first body 101. In this embodiment, the first body and the second body are separable. The rotational connection mechanism 104 will be specifically explained below.

Figure 5:
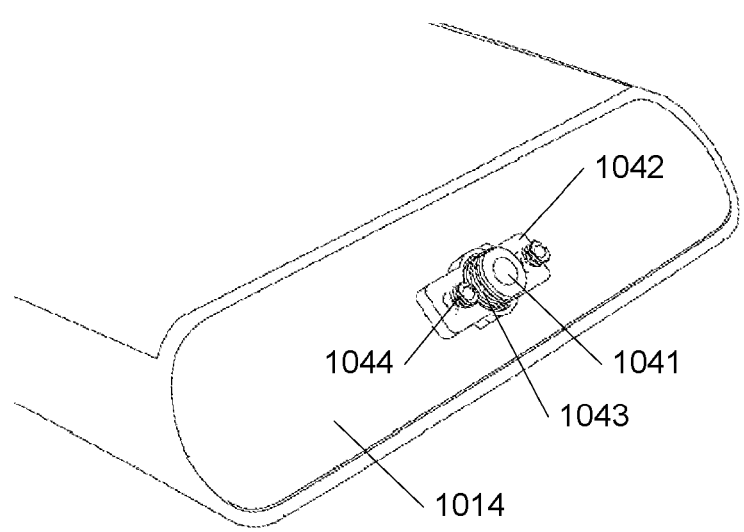
FIG. 5 is a structure diagrams of a rotational connection structure according to an embodiment of the present application.

In a detailed implementation, the first body 101 further has a second face 1012 close to a second edge 1022. Furthermore, the first body 101 has a seventh face 1013 and a third face 1014. The seventh face 1013 is opposite to the first face 1011. The second 1012 intersects the first face 1011 and the seventh face 1013. The third face 1014 is connected to the first face 1011 and the seventh face 1013, opposite to the second face 1012 and close to the first edge 1021. Referring to FIG. 5 which is an exemplary structure diagrams of the rotational connection structure 104, the rotational connection structure 104 comprises a rotor axis 1041, one end of which is fixed on the third face 1014 and the other end of which has a securing part 1043 for securing a securing board 1042 between the third face 1014 and the securing part 1043. The securing board 1042 is fit to the rotor axis 1041 and capable of rotating around the rotor axis 1041. Furthermore, connectors 1044 are set at the two ends of the securing board 1042 for connecting with the second body 103. When the second body 103 is connected to the connectors 1044, if there is a force applied to the second body 103 and driving the second body 103 to rotate, the second body 103 will then drive the securing board 1042 to rotate around the rotor axis 1041.

Figure 6A:
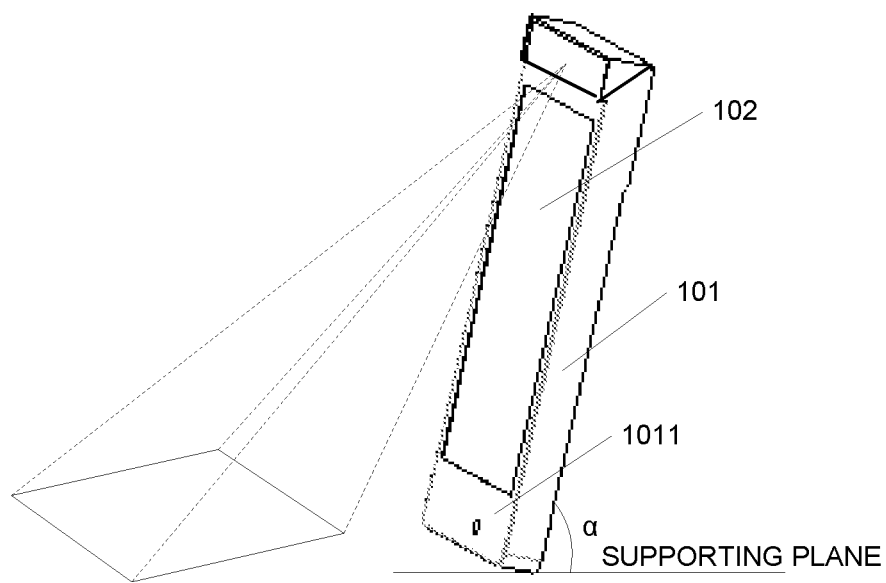
FIGS. 6a-6c are illustrative diagrams of different projection methods according to another embodiment of the present application.
Figure 6B:
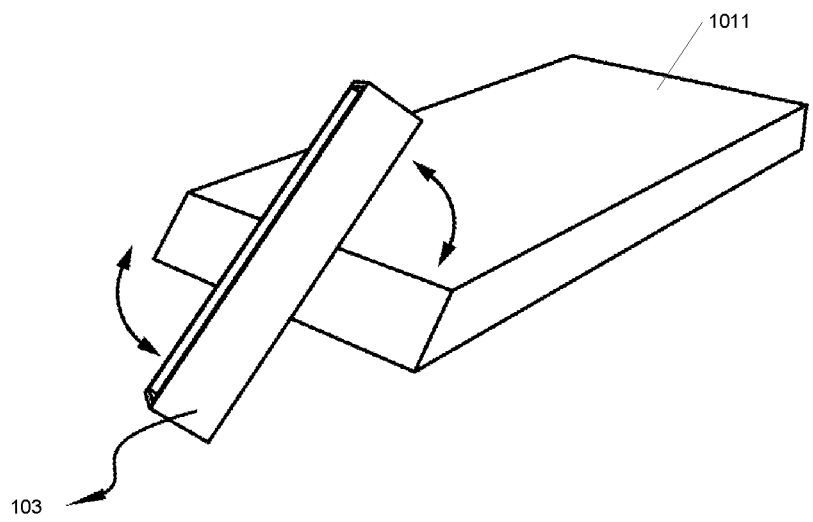

In this embodiment, there are two position relationships between the first body and the second body when the second body rotates the connection mechanism. The electronic device is able to switch between the first mode and the second mode by implementing different projection modes in different position relationships, and thus the structure is simple and easy to be operated and used. Additionally, the second body may comprise a light path changing unit for changing the path of light when the first body and the second body have a different position relationship, so that the electronic device may be in a different projection mode. For example, referring to FIG. 6*a*, the electronic device is now in the second mode and the light path of the projection is in the direction as shown in FIG. 6*a*. When the connection mechanism is rotated, as shown in FIG. 6*b*, the electronic device may be now in the first mode and the light path of the projection is in the direction as shown in FIG. 6*b*.

The light path changing unit is, for example, a reflective mirror. In other embodiments, of course, other structure can be used (such as a system of reflective mirrors) and the application will not apply limitation to it.

Figure 6C:
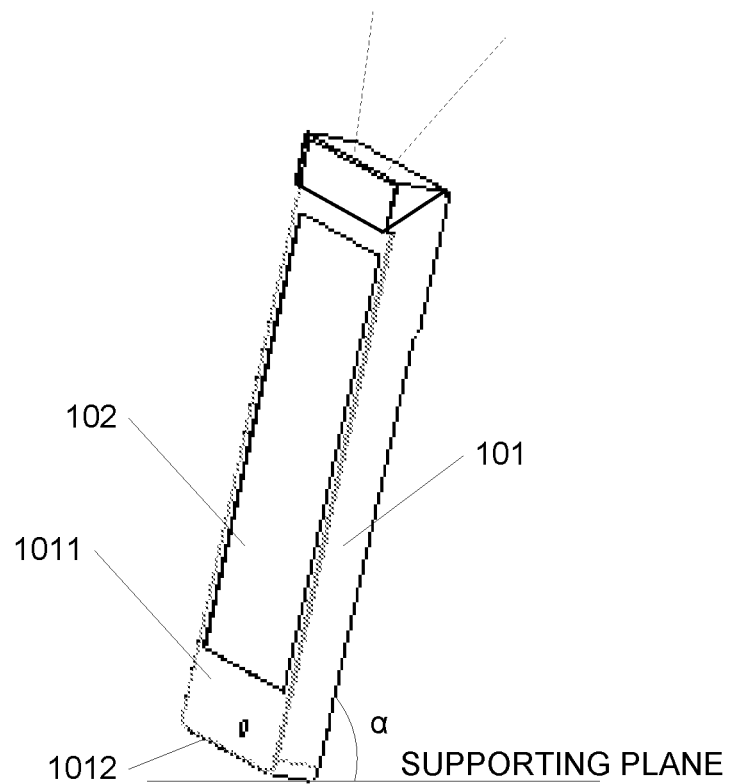

Accordingly, in this embodiment, obtaining the first switching operation comprises: when the connection mechanism 104 is rotated so that the first display interface is located at the second side corresponding to the second edge of the display unit 102, the first switching operation is obtained. At this time, after the connection mechanism has been rotated, the position relationship between the first display interface and the second display interface is the one shown in FIG. 6a, i.e. the electronic device enters the second mode in response to the first switching operation. Obtaining the second switching operation comprises: when the connection mechanism 104 is rotated so that the first display interface is located at the first side corresponding to the first edge of the display unit 102, the second switching operation is obtained. At this time, after the connection mechanism has been rotated, the position relationship between the first display interface and the second display interface is the one shown in FIG. 6c, i.e. the electronic device enters the first mode in response to the second switching operation.

Of course, in the practical implementation, the first method for obtaining the switching operation may also apply to the state that the first body and the second body are separate. In other embodiments, the rotational connection mechanism 104 may be of other structures, as long as the position relationship of the second body 103 with respect to the first body 101 via the rotational connection mechanism 104 can be rotatablely switched so that the electronic device can switch between the first mode and the second mode.

It can be seen from the above detailed description of the implementation of the information processing methods in the embodiments that the projection unit acts as an output unit and the display unit acts as an auxiliary input unit in the case that the electronic device is in the first mode, and that the display unit is switched to act as an output unit and the projection unit is set as an auxiliary input unit in the case that the electronic device switches from the first mode to the second mode.

Figure 7:
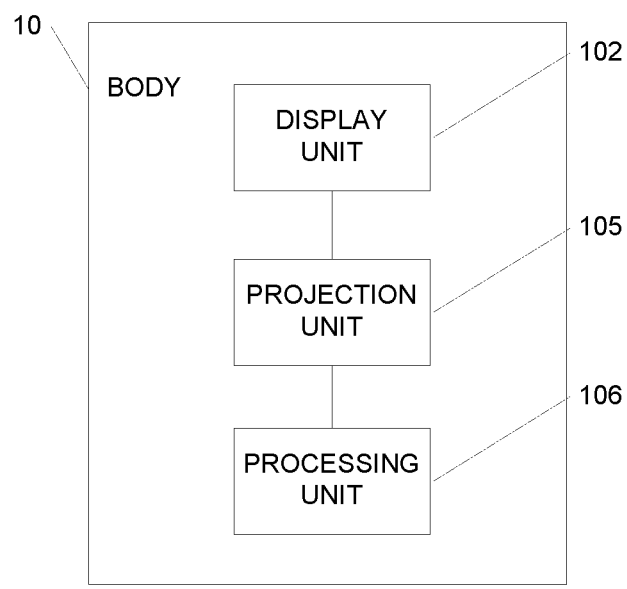
FIG. 7 is a functional block diagram of an electronic device according to another embodiment of the present application.

Based on the same inventive conception, an embodiment of the present application also provides an electronic device. As shown in FIG. 7, the electronic device comprises: a body 10; a display unit 102 set on a first face of the body 10, the display unit 102 having a first edge and a second edge opposite to the first edge, wherein the second edge is parallel to the first edge; a projection unit 105 set inside the body 10 and configured to project the content to be projected through a projection area, a first display interface corresponding to the content to be projected being formed when a first bearing plane is present in the projection area, the first display interface being located at a first side corresponding to the first edge of the display unit 102; a processing unit 106 configured to: obtain a first switching operation instructing the electronic device to switch from the first mode to a second mode when the electronic device is in a first mode, respond to the first switching operation, control the electronic device to switch from a first mode to a second mode; wherein the display unit 102 acts as an auxiliary input unit and the projection unit 105 is set as an output unit in the case that the electronic device is in the first mode; and wherein the display unit 102 acts as an output unit and the projection unit 105 is set as an auxiliary input unit in the case that the electronic device is in the second mode.

Optionally, in the case that the electronic device is in the second mode, the processing unit 106 may be further configured to: obtain a second switching operation instructing the electronic device to switch from the second mode to the first mode. In response to the second switching operation, the electronic device is controlled to switch from the second mode to the first mode.

Optionally, the electronic device further comprises: a first input unit which is enabled, in the case that the electronic device is in the first mode, to implement an auxiliary input function by the first input unit; and a second input unit which is enabled, in the case that the electronic device is in the second mode, to implement an input control function on the first display unit by the second input unit.

Optionally, in the case that the electronic device switches from the first mode to the second mode, the processing unit may be further configured to: adjust the display direction of the auxiliary input unit to be consistent with the display direction of the output unit.

Optionally, in the case that the electronic device switches from the first mode to the second mode, the processing unit may be further configured to: exchange the projected content of the projection unit 105 and the displayed content on the display unit 102.

Optionally, the processing unit may be further configured to: obtain the first switching operation in the case that the angle between the display unit 102 and the horizontal plane is adjusted to fall into a first predetermined range; and obtain the second switching operation in the case that the angle between the display unit 102 and the horizontal plane is adjusted to fall into a second predetermined range.

Optionally, referring to FIG. 4, the body 10 may comprises: a first body 101; a second body 103; and a rotational connection structure 104 for rotatablely connecting the first body 101 and the second body 103, wherein a display unit 102 is set on a first face 1011 of the first body 101, and a projection unit 105 is set inside the first body 101.

Optionally, the processing unit may be further configured to: obtain the first switching operation in the case that the connection mechanism 104 is rotated so that the first display interface is located at the second side corresponding to the second edge of the display unit 102; and obtain the second switching operation in the case that the connection mechanism 104 is rotated so that the first display interface is located at the first side corresponding to the first edge of the display unit 102.

The electronic device of this embodiment and the information processing method stated previously in FIG. 3 and its variant embodiments are inventions under the same conception. The implementation procedures of the electronic device according to the embodiments will be obvious to one with ordinary skills in the art in view of the detailed description of the information processing method and its variants stated previously, and thus are omitted herein for the purpose of concision.

According to one or more of the embodiments of the present application stated above, at least the following technical effects can be achieved:

The projection unit acts as an output unit and the display unit acts as an auxiliary input unit in the case that the electronic device is in the first mode, and the display unit is switched to act as an output unit and the projection unit is set as an auxiliary input unit in the case that the electronic device switches from the first mode to the second mode.

One with ordinary skills in the art should understand that the embodiments of the present application can be provided as methods, systems or computer program products. Accordingly, the present application may take the form of an entirely hardware embodiment, a software embodiment or an embodiment combining software and hardware aspects. Furthermore, the present application may take the form of a computer program product on one or more computer-usable storage mediums (comprises but does not limit to magnetic disks, CD-ROM, optical memories, etc.) having computer-usable program code embodied in the medium.

The present application was described referring to the flowcharts and/or block diagrams of the methods, the devices (systems), and the computer program products according to the embodiment of the present application. It should be understood that each flow and/or block in the flowcharts and/or block diagrams, and the combination of the flows and/or blocks in the flowcharts and/or block diagrams may be implemented by computer program instructions. These computer program instructions may be provided to a general purpose computer, a special purpose computer, an embedded computer or the processors of other programmable data processing devices to product a machine, so that the instructions executed by the computers or the processors of other programmable data processing devices produce an apparatus for implementing the functions specified in one or more flows in the flowcharts and/or one or more blocks in the block diagrams.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in one or more flows in the flowcharts and/or one or more blocks in the block diagrams.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the function specified in one or more flows in the flowcharts and/or one or more blocks in the block diagrams.

Particularly, the computer program instructions corresponding to the information processing methods in the embodiments of the application can be stored in a storage medium such as an optical disc, a hard disc, an USB flash disc, etc. When the computer program instructions corresponding to the information processing method in the storage medium are read or executed by an electronic device, the following steps are performed, including:

obtaining a first switching operation instructing the electronic device to switch from the first mode to a second mode in the case that the electronic device is in a first mode, respond to the first switching operation, controlling the electronic device to switch from a first mode to a second mode; wherein the display unit acts as an auxiliary input unit and the projection unit is set as an output unit in the case that the electronic device is in the first mode; and wherein the display unit acts as an output unit and the projection unit is set as an auxiliary input unit in the case that the electronic device is in the second mode.

Optionally, the electronic device further comprises a first input unit and a second input unit. The storage mediums further stores other computer instructions which is executed together with the step of the electronic device being in the first mode and when executed, the following step is performed: enabling a first input unit so as to implement the auxiliary input function by the first input unit. In the case that the electronic device is in the second mode, the method further comprises: enabling a second input unit so as to implement an input control function on the first display unit by the second input unit.

Optionally, the storage mediums further stores other computer instructions which is executed together with the step of the electronic device switching from the first mode to the second mode and when executed, the following step is performed: adjusting the display direction of the auxiliary input unit to be consistent with the display direction of the output unit.

Optionally, the storage mediums further stores other computer instructions which is executed together with the step of the electronic device switching from the first mode to the second mode and when executed, the following step is performed: exchanging the projected content of the projection unit and the displayed content on the display unit.

Optionally, the storage mediums further stores other computer instructions which is executed together with the step of the electronic device being in the second mode and when executed, the following steps are performed: obtaining a second switching operation instructing the electronic device to switch from the second mode to the first mode, responding to the second switching operation, and controlling the electronic device to switch from the second mode to the first mode.

Optionally, obtaining the first switching operation, in the execution of its corresponding computer instructions, comprises the following step: obtaining the first switching operation in the case that the angle between the display unit and the horizontal plane is adjusted to fall into a first predetermined range. Obtaining the second switching operation, in the execution of its corresponding computer instructions, comprises the following step: obtaining the second switching operation in the case that the angle between the display unit and the horizontal plane is adjusted to fall into a second predetermined range.

Optionally, the body comprises: a first body; a second body; and a rotational connection structure for rotatably connecting the first body and the second body, wherein the display unit is set on a first face of the first body, and the projection unit is set inside the first body.

Optionally, obtaining the first switching operation, in the execution of its corresponding computer instructions, comprises the following step: obtaining the first switching operation in the case that the connection mechanism is rotated so that the first display interface is located at the second side corresponding to the second edge of the display unit. Obtaining the second switching operation, in the execution of its corresponding computer instructions, comprises the following step: obtaining the second switching operation in the case that the connection mechanism is rotated so that the first display interface is located at the first side corresponding to the first edge of the display unit.

Though the preferable embodiments of the present application have been described, other alterations and modifications can be made once one with ordinary skills in the art knows the basic inventive conception. Therefore, the appended claims should be interpreted as including the preferable embodiments and all the alterations and modifications falling into the scope of the present application.

Obviously, one with ordinary skills in the art can make alterations and modifications without departing from the spirit and scope of the present application. As such, if these alterations and modifications of the present application fall into the scope of the claims of the present application and equivalents thereof, the present application intends to contain these alterations and modifications.

We claim:

1. An information processing method comprising:
   obtaining a first switching operation instructing an electronic device to switch from a first mode to a second mode in the case that the electronic device is in the first mode;
   responding to the first switching operation; and
   controlling the electronic device to switch from the first mode to the second mode;
   wherein a display unit set in a face of the electronic device acts as an auxiliary input unit and a projection unit, for projecting content, is set as an output unit in the case that the electronic device is in the first mode;
   wherein the display unit acts as an output unit and the projection unit is set as an auxiliary input unit in the case that the electronic device is in the second mode; and
   wherein obtaining the first switching operation comprises: obtaining the first switching operation in the case that an angle between the display unit and a horizontal plane is adjusted to fall into a first predetermined range;
   wherein the method further comprises:
   obtaining a second switching operation instructing he electronic device to switch from the second mode to the first mode in the case that the electronic device is in the second mode;
   responding to the second switching operation; and
   controlling the electronic device to switch from the second mode to the first mode;
   and wherein obtaining the second switching operation comprises: obtaining the second switching operation in the case that the angle between the display unit and the horizontal plane is adjusted to fall into a second predetermined range.

2. The method of claim 1, wherein
   in the case that the electronic device is in the first mode, the method further comprises: enabling a first input unit of the electronic device so as to implement an auxiliary input function by the first input unit; and
   in the case that the electronic device is in the second mode, the method further comprises:
   enabling a second input unit of the electronic device so as to implement an input control function on a first display interface by the second input unit.

3. The method of claim 1, wherein in the case that the electronic device switches from the first mode to the second mode, the method further comprises:
   adjusting the display direction of the auxiliary input unit to be consistent with the display direction of the output unit.

4. The method of claim 1, wherein in the case that the electronic device switches from the first mode to the second mode, the method further comprises:
   exchanging the projected content of the projection unit and displayed content of the display unit.

5. An electronic device comprising:
   a body;
   a display unit set on a first face of the body, the display unit having a first edge and a second edge opposite to the first edge, wherein the second edge is parallel to the first edge;
   a projection unit set inside the body and which projects the content to be projected onto a first display interface, the first display interface being projected at a first side corresponding to the first edge of the display unit, the display unit being capable of displaying a second display interface, a predetermined angle being formed between the first display interface and the second display interface; and
   a processing unit which:
   obtains a first switching operation instructing the electronic device to switch from a first mode to a second mode in the case that the electronic device is in the first mode;
   responds to the first switching operation; and
   controls the electronic device to switch from the first mode to the second mode;
   wherein the display unit acts as an auxiliary input unit and the projection unit is set as an output unit in the case that the electronic device is in the first mode; and
   wherein the display unit acts as an output unit and the projection unit is set as an auxiliary input unit in the case that the electronic device is in the second mode;
   wherein the processing unit further:
   obtains the first switching operation in the case that the angle between the display unit and the horizontal plane is adjusted to fall into a first predetermined range;
   wherein the processing unit further:
   obtains a second switching operation instructing the electronic device to switch from the second mode to the first mode in the case that the electronic device is in the second mode;
   responds to the second switching operation; and
   controls the electronic device to switch from the second mode to the first mode;
   and wherein the processing unit further obtains the second switching operation in the case that the angle between the display unit and the horizontal plane is adjusted to fall into a second predetermined range.

6. The electronic device of claim 5, wherein the electronic device further comprises:
   a first input unit, which is enabled in the case that the electronic device is in the first mode so as to implement the auxiliary input function by the first input unit; and
   a second input unit, which is enabled in the case that the electronic device is in the second mode so as to implement an input control function on the first display interface by the second input unit.

7. The electronic device of claim 5, wherein in the case that the electronic device switches from the first mode to the second mode, the processing unit is further configured to:
   adjust the display direction of the auxiliary input unit to be consistent with the display direction of the output unit.

8. The electronic device of claim 5, wherein in the case that the electronic device switches from the first mode to the second mode, the processing unit further exchanges the projected content of the projection unit and the displayed content of the display unit.

9. The electronic device of claim 5, wherein the body comprising:
   a first body;
   a second body; and
   a rotational connection structure for rotatablely connecting the first body and the second body,
   wherein the display unit is set on a first face of the first body, and the projection unit is set inside the first body.

10. An electronic device comprising:
    a body;

a display unit set on a first face of the body, the display unit having a first edge and a second edge opposite to the first edge, wherein the second edge is parallel to the first edge;

a projection unit set inside the body and which projects the content to be projected onto a first display interface, the first display interface being projected at a first side corresponding to the first edge of the display unit, the display unit being capable of displaying a second display interface, a predetermined angle being formed between the first display interface and the second display interface; and a processing unit which:

obtains a first switching operation instructing the electronic device to switch from a first mode to a second mode in the case that the electronic device is in the first mode;

responds to the first switching operation; and controls the electronic device to switch from the first mode to the second mode; wherein the display unit acts as an auxiliary input unit and the projection unit is set as an output unit in the case that the electronic device is in the first mode; wherein the display unit acts as an output unit and the projection unit is set as an auxiliary input unit in the case that the electronic device is in the second mode, wherein the processing unit further:

obtains the first switching operation in the case that a connection mechanism, rotatablely connecting a first body of the electronic device and a second body of the electronic device, is rotated so that the first display interface is located at a second side corresponding to the second edge of the display unit;

wherein the processing unit further:

obtains a second switching operation instructing the electronic device to switch from the second mode to the first mode in the case that the electronic device is in the second mode;

responds to the second switching operation; and controls the electronic device to switch from the second mode to the first mode, and wherein the processing unit further obtains the second switching operation in the case that the connection mechanism is rotated so that the first display interface is located at a first side corresponding to the first edge of the display unit.

11. An information processing method comprising:

obtaining a first switching operation instructing an electronic device to switch from a first mode to a second mode in the case that the electronic device is in the first mode;

responding to the first switching operation; and controlling the electronic device to switch from the first mode to the second mode;

wherein a display unit set in a face of the electronic device acts as an auxiliary input unit and a projection unit, for projecting content, is set as an output unit in the case that the electronic device is in the first mode;

wherein the display unit acts as an output unit and the projection unit is set as an auxiliary input unit in the case that the electronic device is in the second mode; and wherein obtaining the first switching operation comprises: obtaining the first switching operation in the case that a connection mechanism, rotatablely connecting a first body of the electronic device and a second body of the electronic device, is rotated so that a first display interface is located at a second side corresponding to the display unit;

wherein the method further comprises:

obtaining a second switching operation instructing the electronic device to switch from the second mode to the first mode in the case that the electronic device is in the second mode;

responding to the second switching operation; and controlling the electronic device to switch from the second mode to the first mode, and wherein obtaining the second switching operation comprises: obtaining the second switching operation in the case that the connection mechanism is rotated so that the first display interface is located at a first side corresponding to the display unit.

12. An information processing method comprising:

obtaining a first switching operation instructing an electronic device to switch from a first mode to a second mode in the case that the electronic device is in the first mode;

responding to the first switching operation; and controlling the electronic device to switch from the first mode to the second mode;

wherein a display unit set in a face of the electronic device acts as an auxiliary input unit and a projection unit, for projecting content, is set as an output unit in the case that the electronic device is in the first mode;

wherein the display unit acts as an output unit and the projection unit is set as an auxiliary input unit in the case that the electronic device is in the second mode; and wherein obtaining the first switching operation comprises: obtaining the first switching operation in the case that an angle between the display unit and a horizontal plane is adjusted to fall into a first predetermined range, and obtaining the second switching operation comprises: obtaining the second switching operation in the case that the angle between the display unit and the horizontal plane is adjusted to fall into a second predetermined range.

\* \* \* \* \*